United States Patent
Pigeon

(10) Patent No.: US 9,394,032 B1
(45) Date of Patent: Jul. 19, 2016

(54) REAR EXTENSIONS FOR BOATS

(71) Applicant: Charles Frank Pigeon, Austin, TX (US)

(72) Inventor: Charles Frank Pigeon, Austin, TX (US)

(73) Assignee: Tige Boats, Abilene, TX (US)

( * ) Notice: Subject to any disclaimer, the term of this patent is extended or adjusted under 35 U.S.C. 154(b) by 279 days.

(21) Appl. No.: 13/646,022

(22) Filed: Oct. 5, 2012

(51) Int. Cl.
*B63B 1/08* (2006.01)
*B63B 35/85* (2006.01)
*B63B 39/06* (2006.01)

(52) U.S. Cl.
CPC .............. *B63B 1/08* (2013.01); *B63B 39/061* (2013.01); *B63B 2035/855* (2013.01)

(58) Field of Classification Search
CPC .... B63B 1/08; B63B 39/06; B63B 2039/065; B63B 1/322; B63B 39/061
USPC .......................................... 114/284, 271, 285
See application file for complete search history.

(56) References Cited

U.S. PATENT DOCUMENTS

| | | | |
|---|---|---|---|
| 4,000,712 A | | 1/1977 | Erikson et al. |
| 4,519,336 A | * | 5/1985 | Mason ........................... 114/286 |
| 5,046,439 A | | 9/1991 | Goodson et al. |
| 5,224,436 A | | 7/1993 | Stricker |
| 5,402,743 A | | 4/1995 | Holderman |
| 5,549,071 A | | 8/1996 | Pigeon et al. |
| 6,138,601 A | * | 10/2000 | Anderson et al. ..... B63B 39/061 114/285 |
| 6,427,616 B1 | | 8/2002 | Hagen |
| 6,675,736 B1 | | 1/2004 | Schreiber et al. |
| 6,874,441 B2 | | 4/2005 | Pigeon |
| 6,923,137 B2 | | 8/2005 | Waits, Jr. |
| 7,246,565 B2 | | 7/2007 | Snook et al. |
| 7,252,047 B1 | | 8/2007 | Baucom, Jr. |
| 7,625,153 B2 | | 12/2009 | Sauerbier |
| 7,856,937 B2 | | 12/2010 | Chapdelaine et al. |
| 8,459,198 B2 | * | 6/2013 | Kilgore ..................... B63B 1/08 114/271 |
| 8,578,873 B2 | * | 11/2013 | Gasper et al. ................. 114/284 |
| 2005/0056200 A1 | | 3/2005 | Pigeon |
| 2011/0011326 A1 | * | 1/2011 | Robinson et al. ............. 114/271 |
| 2011/0232557 A1 | | 9/2011 | Kilgore |

* cited by examiner

*Primary Examiner* — S. Joseph Morano
*Assistant Examiner* — Andrew Polay
(74) *Attorney, Agent, or Firm* — Egan, Peterman, Enders & Huston LLP

(57) ABSTRACT

Rear boat extensions for boats and boats having such are provided. Some embodiments of boats include a rear boat extension as an attachment to their transom. Other embodiments of boats include a rear boat extension as a stern end part of a single molded component which includes the hull of the boat. In either case, the rear boat extension has a smaller depth than an adjacent part of the boat's hull. In some embodiments, a rear boat extension may be tapered toward its rearward end. In some cases, a rear boat extension may include peripheral sidewalls and may be open or include an opening at its rearward end or between upper edges of its peripheral sidewalls. In yet other embodiments, a rear boat extension may not include peripheral sidewalls. In any case, a rear boat extension may additionally or alternatively include an opening or recess within its bottom surface.

22 Claims, 6 Drawing Sheets

REAR EXTENSIONS FOR BOATS

BACKGROUND OF THE INVENTION

1. Field of the Invention

This invention generally relates to boats and, more specifically, to rear extensions for boats.

2. Description of the Related Art

The following descriptions and examples are not admitted to be prior art by virtue of their inclusion within this section.

Propeller-driven boats are often used for water sports, such as but not limited to water skiing, knee-boarding, wake boarding and wake surfing. The size and shape of desirable wakes and waves varies for each sport and is also dependent on the skill and preference of the person performing the sport. For instance, it is often desirable to water ski and knee board with relatively flat wakes and, conversely, it is often desirable to wake board and wake surf on relatively larger wakes/waves, but there is a degree of variability in each of such groupings. Given such variances on desirable sizes and shapes of wakes and waves for different water sports and preferences, achieving differing and optimal wake/wave size and shape for each sport and skill-type on a given boat is very difficult. Due to the rise in popularity of wakesurfing, inboard boats may be particularly susceptible to such challenges. Most water sports are performed on boats with planing hulls, which when planed produce a relatively small and clean wake and, thus, are generally conducive for water skiing and knee boarding. For sports utilizing relative large wakes and waves, boats are generally operated at slow enough speeds so that they do not plane and are weighted to displace a relatively large amount of water, particularly at the boat stern to produce relatively large wakes and waves. The size and shape of a wake or wave generated by such a technique as well as the distance a wave is from the boat, however, are often limited and are particularly dependent on the amount and placement of ballasts in the boat as well as the design of the boat. It, therefore, would be desirable to develop boats and/or devices which may aid in manipulating the size and shapes of wakes and/or waves.

SUMMARY OF THE INVENTION

The following description of various embodiments of boats and rear boat extensions is not to be construed in any way as limiting the subject matter of the appended claims.

Some embodiments of boats include a rear boat extension attached to a transom of the boat. Other embodiments of boats include a rear boat extension as a stern end part of a single molded component which includes the hull of the boat. In either case, the rear boat extension has a smaller depth than an adjacent part of the hull. In some embodiments, a rear boat extension is independent of a boat. In any such cases, a rear boat extension may, in some embodiments, be tapered toward its rearward end. In some cases, a rear boat extension may include peripheral sidewalls. In some of such embodiments, a rear boat extension may be open or include an opening at its rearward end between its peripheral sidewalls. In yet other cases, a rear boat extension may not include peripheral sidewalls. In some embodiments, a rear boat extension may include a top side plate with an optional opening or, alternatively, may be void of a top side plate. In any case, a rear boat extension may, in some embodiments, include an opening or recess within its bottom surface.

BRIEF DESCRIPTION OF THE DRAWINGS

Other objects and advantages of the invention will become apparent upon reading the following detailed description and upon reference to the accompanying drawings in which.

Figure 1:
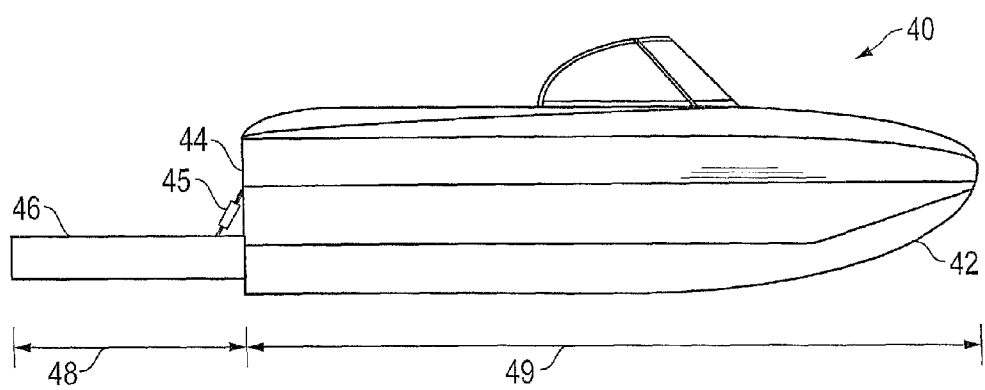
FIG. 1 is a sideview of a boat with a rear boat extension attached to its transom.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Figure 2:
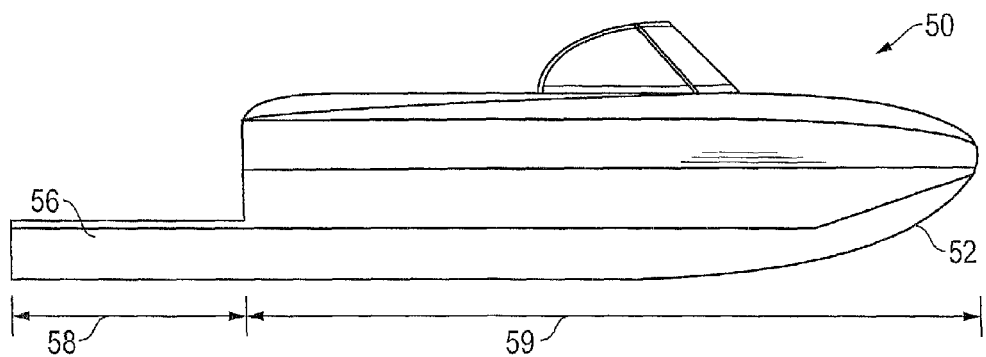
FIG. 2 is a sideview of a boat having a rear boat extension as a stern end part of a single molded component of the boat.

Turning to the drawings, an example of a boat having a rear boat extension extending from its transom is shown in FIG. 1. FIG. 2 illustrates a boat having a rear boat extension as a stern end part of a single molded component of the boat. As will be set forth in more detail below, rear boat extensions described herein are configured to manipulate the size and/or shapes of wakes and/or waves, particularly by displacing more water when the boat is not planed and providing contours for manipulating shapes of wakes/waves. In addition, rear boat extensions are provided which generate cleaner wakes and/or waves (as opposed to boats without a rear boat extension), minimize prop wash and control exhaust of a boat. In many cases, the configuration of a rear boat extension to accomplish the noted objectives may be specific for water sports performed behind a boat, such as but not limited to water skiing, knee boarding, wake boarding, wake surfing, hydrofoiling and tubing. Several example configurations of rear boat extensions are shown and described in reference to FIGS. 3-24 that may be used for boats including but not limited to the ones depicted in FIGS. 1 and 2. It is noted that many of the rear boat extension configurations depicted and discussed in reference to FIGS. 3-24 may be combined for a single rear boat extension. As will be set forth in more detail below, the boats and rear boat extensions described herein are not limited to the depictions in the drawings. Furthermore, it is noted that the drawings are not necessarily drawn to scale in that particular features may be drawn to a larger scale than other features to emphasize their characteristics.

Boat 40 is shown in FIG. 1 having rear boat extension 46 extending from hull 42 at transom 44. In some cases, rear boat extension 46 may be permanently affixed to transom 44. In other embodiments, rear boat extension 46 may be detachable from transom 44. In either case, it is noted that the attachable configuration of rear boat extension 46 may be alternatively referenced herein as a "rear boat adjunct" or a "rear boat attachment". Regardless of whether rear boat extension 46 is permanently affixed or is detachable from transom 44, rear boat extension 46 and hull 42 are discrete components. Conversely, boat 50 is shown in FIG. 2 with rear boat extension 56 as part of a single molded component of the boat which includes hull 52. Either configuration may serve the same objective for a boat (i.e., to manipulate the size and/or shapes of wakes and/or waves, generate a cleaner wake and/or wave, minimize prop wash, and/or control exhaust).

In fact, the rear boat extension configurations of FIGS. 1 and 2 may be described in a similar manner. In particular, as shown in FIGS. 1 and 2, boats 40 and 50 respectively include first portions 49 and 59 comprising a majority length of the boats extending between port and starboard sidewalls of the boat. In addition, boats 40 and 50 respectively include second portions 48 and 58 extending from first portions 49 and 59 to the sterns of the boats. As shown in FIGS. 1 and 2, second portions 48 and 58 have shorter sidewalls than first portions 49 and 59. The arrangement of second portions 48 and 58 relative to first portions 49 and 59 may be used to delineate the "front end" and "back end" of the rear boat extensions described herein as they may be applicable to either of the configurations denoted in FIGS. 1 and 2. In particular, the front ends of rear boat extensions 46 and 56 are the ends arranged at the interface of portions 48 and 49 and portions 58 and 59, respectively. The back ends of rear boat extensions 46 and 56 are the distal ends opposing the front ends.

Boats 40 and 50 may, in general, be any type and size of motor boat. In some cases, boats 40 and 50 may be inboard boats, but outboard boats and inboard/outboard boats may be considered as well. As noted above, the rear boat extensions described herein may be configured to manipulate the size and/or shapes of wakes and/or waves, generate cleaner wakes and/or waves, minimize prop wash, or control exhaust for one or more water sports, which may include wakesurfing. As a safety precaution, wakesurfing is only generally performed on inboard boats and, thus, in some cases, it may be particularly advantageous to have boats 40 and 50 be inboard boats. Other water sports are performed using inboard boats, so configuring an inboard boat with a rear boat extension described herein may be advantageous for reasons other than for wakesurfing.

As used herein, the term "inboard boat" refers to a boat having an engine disposed within a hull of the boat and a drive propeller disposed beneath the hull. With respect to FIG. 1, in embodiments in which boat 40 is an inboard boat, the engine would be disposed within hull 42 with a drive propeller beneath the hull. With respect to FIG. 2, in embodiments in which boat 50 is an inboard boat, it would be preferable to have the engine disposed within portion 59 of hull 52 and a drive propeller beneath it. The engine of an inboard boat may be referred to herein as an "inboard engine". Inboard boats considered herein may have a v-drive or a direct drive configuration. As used herein, a direct drive inboard configuration has the powerplant mounted near the middle of the boat with the propeller shaft straight out the back, where a v-drive configuration has the powerplant mounted in the back of the boat facing backwards having the shaft directed towards the front of the boat and then making a 'V' towards the rear. The v-drive configuration has become increasingly prevalent due to the relatively recent popularity of wakeboarding and wakesurfing.

As noted above, boats 40 and 50 may be any size of motor boats. In some cases, the portion of boats 40 and 50 without their rear boat extensions may have lengths less than 26 feet and, more specifically, between approximately 16 feet and approximately 26 feet. In particular, boats of such length ranges may be more apt to realize the manipulative features of the rear boat extensions described herein as opposed to smaller or larger boats. More specifically, smaller boats (i.e., boats less than 16 feet in length, not including a length of a rear boat extension thereon) may not have sufficient weight or weight capacity to facilitate the manipulation of water needed to make a wake and/or wave of particular size and/or shape using some of the hull extensions described herein. Moreover, larger boats (i.e., boats of 26 feet length or greater, not including a length of a rear boat extension thereon) may be too heavy and/or bulky to realize the benefit of some of the rear boat extension configurations described herein to make a wake and/or wave of particular size and/or shape.

For example, boats of 26 feet length or greater (not including a length of a possible rear boat extension thereon) are generally not listed to one side for wakesurfing due to their girth, but rather make sizeable wakesurfing waves simply by running at low speeds and setting their trim tabs low. Although some of the rear boat extensions described herein may manipulate the size and/or shapes of waves for such boats, some of the rear boat extensions described herein may be specifically configured to manipulate the size and/or shapes of waves when a boat is listed to one side. Thus, some rear boat extensions considered herein may be more applicable to boats with a length less than 26 feet (not including a length of a possible rear boat extension thereon) and, more specifically, between approximately 16 feet and approximately 26 feet (not including a length of a possible rear boat extension thereon). It is noted, however, that smaller and larger boats may be considered for rear boat extensions and, particularly, the configurations of rear boat extensions described herein.

As set forth in more detail below, the rear boat extensions described herein may include a variety of configurations, some of which are described relative to the dimensions and configurations of a boat's hull. In some cases, such as described in reference to FIGS. 2, 3 and 5, a rear boat extension may be an extension of a hull of the boat, referred to herein as a "hull extension". The term "hull extension" as used herein refers to a section of a boat at the stern or a device which is attachable to the stern of a boat which provides an expansion of at least one section of the boat's hull (e.g., a bottom or a sidewall) in the rearward direction. Alternatively stated, a "hull extension" as used herein is a section of a boat at the stern, or a device which is attachable to the stern of a boat, which has at least one front end surface that is substantially flush (or is designed for at least one of its surfaces to be substantially flush) with a surface of the boat's hull. Used in such context herein, the term "flush" refers to being even, level and/or forming the same plane, but does not necessitate surfaces be in contact with each other. As such, the term hull extension as used herein encompasses sections of boats and devices which are spaced apart (or are designed to be spaced apart) from adjacent portions of boat hulls as well as those which have surfaces in contact with adjacent portions of boat hulls. In some cases, a hull extension may have a bottom surface with at least a front end which is flush (or are designed for its bottom surface to be flush) with a bottom surface of a boat's hull. In such cases, the hull extension serves to extend the running surface of the hull when the boat is planed. In some embodiments, a hull extension may additionally or alternatively include one or more sidewall surfaces having at least front ends flush (or designed to be flush) with sidewall surfaces of a boat's hull. It is noted that an entire length of a hull extension surface may be flush with a boat's hull, but it is not a necessity for the term "hull extension" used herein.

Figure 4:
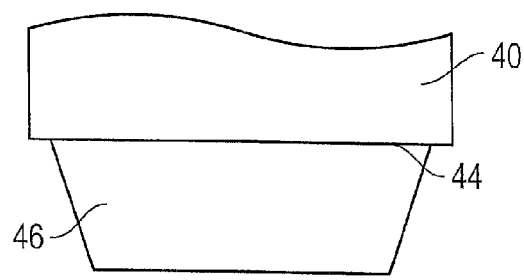

In alternative cases, such as described in reference to the combination of FIGS. 1 and 4, the rear boat extensions described herein may not have (or be designed to have) a surface which is substantially flush with a surface of a boat's hull. Such boat extensions may include bottoms at a level above or below a bottom surface of a hull and sidewall surfaces along a plane inward or outward from sidewalls of a hull. Boat extensions which do not have (or not designed to have) a surface which is substantially flush with a surface of a boat's hull may be grouped with hull extensions and referenced as a whole as "rear boat extensions." Similar to the configurations of hull extensions described above, boat extensions which do not have (or not designed to have) a surface which is substantially flush with a surface of a boat's hull may be spaced apart (or are designed to be spaced apart) from adjacent portions of boats or may have surfaces in contact with adjacent portions of boats.

Regardless of whether the rear boat extensions described herein include a bottom surface and/or sidewall surface/s flush with a boat's hull, the rear boat extensions described herein are common in that their uppermost surfaces do not align with upper surfaces of an adjacent section of the boat. In other words, the rear boat extensions described herein do not provide an expansion of an upper section of a boat's hull in the rearward direction. In this manner, the rear boat extensions described herein do not serve to extend a main deck or superstructure of a boat. In general, the rear boat extensions described herein may be made of any suitable material for attaching to a boat and for proper operation of a boat. Fiberglass materials are preferred, but other materials may be considered. Furthermore, it is preferred the rear boat extensions described herein are hollow, but solid rear boat extensions may be considered. In any case, the rear boat configurations described herein may include one or more of the configurations set forth below in reference to FIGS. 3-24 to manipulate the size and/or shapes of wakes and/or waves. It is noted that although the disclosure set forth below emphasizes the configurations of FIGS. 3-24 in reference to FIGS. 1 and 2, it is noted that the configurations of FIGS. 3-24 may be generally applied to any type of rear boat extension.

Turning back to FIG. 1, boat 40 includes rear boat extension 46 extending from hull 42 at transom 44. In general, any means known in the art which may be applicable for attaching a rear boat extension onto a transom of a boat may be used and transom 44 may be retrofitted if needed to accommodate a particular attachment means. As noted above, the term rear boat extension as used herein encompasses devices which are spaced apart (or are designed to be spaced apart) from adjacent portions of boat hulls as well as those which have surfaces in contact with adjacent portions of boat hulls. Thus, while rear boat extension 46 may be in contact with transom 44 as shown in FIG. 1, rear boat extension 46 may alternatively be spaced apart from transom 44 at any point along rear boat extension 46. Such spacing may be induced by the attachment means used to attach rear boat extension 46 to transom 44 or may be part of the design to manipulate the size and/or shapes of wakes and/or waves generated from boat 40. In any case, the bottom surface of rear boat extension 46 may, in some embodiments, be at a level above the bottom surface of hull 42 at transom 44 as shown in FIG. 1. In alternative cases, rear boat extension 46 may have a bottom surface at a level below the bottom surface of hull 42 at transom 44. In yet other embodiments, the bottom surface of rear boat extension 46 may be substantially flush with the bottom surface of hull 42 at transom 44 and, thus, may be a hull extension. As noted above, such a configuration of a rear boat extension serves to extend the running surface of a hull when a boat is planed, and, thus, boat 40 may be referenced as having a running surface extending along portions 48 and 49 in such embodiments.

As noted above, rear boat extension 46 may be permanently affixed to transom 44 or may be detachable from transom 44. Both configurations offer application to existing boats and a detachable configuration may be particularly advantageous to provide versatility to move and/or remove the rear boat extension when desired. In some detachable embodiments, boat 40 may include actuators for moving rear boat extension 46 into and out of the position shown in FIG. 1. Example hydraulic actuator 45 is shown in FIG. 1, but other types and arrangements of actuators may be used. In some cases, actuators may be used to move rear boat extension 46 in and out of the water in which boat 40 resides. In addition or alternatively, actuator/s may be used to change the angle rear boat extension 46 is arranged relative to transom 44 to alter the shape and/or size of a wake or wave. In other cases, boat 40 may additionally or alternatively include actuator/s for moving rear boat extension 46 up, down, or away from transom 44 to manipulate the shape and/or size of a wake or wave. In some embodiments, rear boat extension 44 may include actuator/s which change the length and/or width of rear boat extension 44 to manipulate the shape and/or size of a wake or wave. Merely as an example of such a concept, rear boat extension 44 may include a configuration (e.g., a material of sufficient flexibility and a structure of sufficient stability) to expand and contract in an accordion style.

In contrast to boat 40, boat 50 is shown in FIG. 2 having rear boat extension 56 as part of a single molded piece which includes hull 52. In other words, rear boat extension 56 and hull 52 are not discrete components. Thus, an advantage of boat 50 versus boat 40 is the avoidance of having to maintain and replace an attachment means when needed. As shown in FIG. 2, the bottom surface of rear boat extension 56 may, in some embodiments, be substantially flush with the bottom surface of portion 59 of hull 52, and, thus, boat 50 may be referenced as having a running surface extending along portions 58 and 59. In such configurations, the configuration of hull 52 and rear boat extension 56 may together be referenced herein as a "stepped hull." In alternative cases, the bottom surface of rear boat extension 56 may be at a level above or below the bottom surface of hull 52

As noted above, the configurations of rear boat extensions 46 and 56 may be configured to manipulate the size and/or shapes of wakes and/or waves and/or generate a cleaner wake and/or wave. Part of the configurations of the rear boat extensions described herein to accomplish one or both of the objectives is to have their uppermost surface at a level below upper surface of an adjacent section of a boat. In relation to FIGS. 1 and 2, such configurations may refer to rear boat extension 46 having an uppermost surface at a level below an upper edge of transom 44 and rear boat extension 56 having an uppermost surface at a level below an upper edge of hull 52. In some cases, the rear boat extensions described herein may include an uppermost surface at a level below a vertical midpoint of an adjacent section of a boat or may include an uppermost surface at a level below the water line of the boat. As used herein, the term "vertical midpoint" refers to the midpoint of an object along its vertical dimension.

Further configurations of rear boat extensions used to accomplish the objectives of manipulating the size and shapes of wakes and/or waves, generating a cleaner wake and/or wave, minimizing prop wash, and/or controlling exhaust may be specific to the dimensions of the rear boat extensions itself, such as width, length and depth. As used herein, the "width" of a rear boat extension refers to the dimension running parallel with the back end of a boat (i.e., the dimension running perpendicular to the direction of the boat from bow to stern). Example width dimensions of rear boat extensions are shown and described in reference to FIGS. 3-5 below. The "length" of a rear boat extension, as used herein, refers to the dimension running parallel with the direction of the boat from bow to stern (i.e., the dimension running perpendicular to the back plane of the boat). In general, the lengths of the rear boat extensions considered herein may generally depend on the objective for the rear boat extension as well as the design of the boat. An example range of lengths for rear boat extensions which may be suitable for boats having lengths between 16 feet and 26 feet (not including the length of the rear boat extensions) may be between approximately 1 foot and approximately 5 feet, but shorter and longer rear boat extensions may be considered. As used herein, the "depth" of a rear boat extension refers to a dimension which extends from a plane comprising an upper surface of a peripheral sidewall of the rear boat extension to an underlying point on a bottom surface of the bottom of the rear boat extension. Example depth dimensions of rear boat extensions are shown and described in reference to FIGS. 10-19 below.

Figure 3:
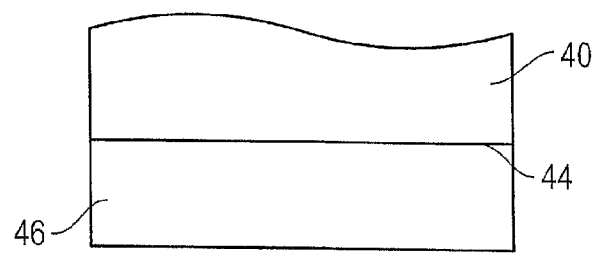
FIGS. 3-5 are partial top views of different embodiments of the backend of the boat illustrated in FIG. 1.
Figure 5:
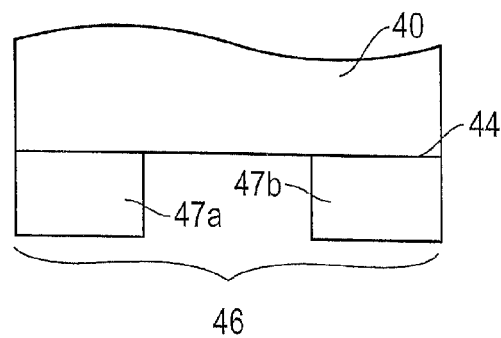

FIGS. 3-5 are partial top views of different embodiments of the back end of boat 40 illustrated in FIG. 1. In particular, FIGS. 3-5 illustrate the back end of boat 40 with different configurations of rear boat extension 46 relative to hull 42 at transom 44. It is noted that the same configurations discussed in reference to FIGS. 3-5 may be used for rear boat extension 56 of boat 50 depicted in FIG. 2. As shown in FIG. 3, rear boat extension 46 may include substantially the same width as transom 44 at transom in some embodiments. In particular cases, rear boat extension 46 may include substantially the same width as transom 44 along the entire length of rear boat extension 46 as shown in FIG. 3. In other embodiments, rear boat extension 46 may include substantially the same width as transom 44 at transom 44 but have at least one varied width at some point along its length. The varied width/s may be larger and/or smaller than the width at transom 44. In any of such cases, the sidewall surfaces of rear boat extension 46 may be flush with the sidewalls of boat 40 at transom 44 and, thus, rear boat extension 46 may be a hull extension in some embodiments.

In yet other embodiments, rear boat extension 46 may have a width at transom 44 which is smaller than the width of transom 44 as shown in FIG. 4. In such cases, the width of rear boat extension 46 may be tapered toward its rearward end as shown in FIG. 4 or may conversely get wider toward its rearward end. In other embodiments, the width of rear boat extension 46 may be constant and/or may vary between getting smaller and larger along its length. In some cases, rear boat extension 46 may have a width at transom 44 which is larger than the width of transom 44. In such embodiments, the width/s of rear boat extension 46 along its length may be constant, smaller, and/or larger than its width at transom 44. In any of the possible embodiments in which a combination of larger or smaller widths along the length of rear boat extension 46 is employed, the variability of widths may, in some embodiments, be induced by rear boat extension 46 having convex and/or concave sidewalls. In general, any width differences between rear boat extension 46 and transom 44 may depend on the objective for the rear boat extension as well as the design of the boat. For example, when rear boat extension 46 is to be used to create a larger or cleaner wave for wakesurfing, a width variation of less than approximately 25% of the transom width may be advantageous. In particular, it is contemplated that minimizing the variation of width between transom 44 and the width of rear boat extension 46 at transom 44 may reduce turbulence at the corner of the boat that it is listed to and, thus, may produce a cleaner wave.

Turning to FIG. 5, rear boat extension 46 may, in some embodiments, have a split configuration. In particular, rear boat extension 46 may include two rear boat extensions 47a and 47b respectively arranged on opposing port and starboard sides of boat 40 at transom 44. In some embodiments, the outer sidewalls of rear boat extensions 47a and 47b may be aligned with the sidewalls of hull 42 at transom 44 as shown in FIG. 5. In other cases, however, the outer sidewalls of rear boat extensions 47a and 47b may be disposed along a plane inward or outward from the sidewalls of hull 42 at transom 44. In view of the latter, the widths of rear boat extensions 47a and 47b may, in some cases, may be greater than 50% of the width of transom 44. In particular, the widths of rear boat extensions 47a and 47b may generally each be between approximately 20% and approximately 75% of the width of transom 44. In some cases, the widths of rear boat extensions 47a and 47b may be the same as shown in FIG. 5, but in other embodiments, they may be different. In any case, the widths of rear boat extensions 47a and 47b may be constant, tapered, and/or expanded along their length. In some cases, one or more of the sidewalls of rear boat extensions 47a and 47b (i.e., the inner sidewalls, the outer sidewalls, or both) may be convex and/or concave.

As noted above, boat 40 may, in some embodiments, include actuator/s for moving rear boat extension 46. In cases in which rear boat extension 46 includes a split design such as described in reference to FIG. 5, boat 40 may, in some embodiments, include actuators for independently moving the two rear boat extensions. In particular, actuators may be used to independently move rear boat extensions 47a and 47b in and out of the water in which boat 40 resides. In addition or alternatively, actuators may be used to independently move rear boat extensions 47a and 47b up, down, and/or away from transom 44, and/or change the angle of the rear boat extensions relative to transom 44, and/or change the length and/or width of the rear boat extensions. In some cases, actuators may be used to independently move rear boat extensions 47a and 47b in proximity to each other. More specifically, actuators may be used to traverse rear boat extension 47a along transom 44 closer to and, in some cases, in contact with rear boat extension 47b and vice versa.

Another manner for the rear boat extensions considered herein to manipulate the size and/or shapes of wakes and/or waves, generate a cleaner wake and/or wave, and/or minimize prop wash is to have their bottom surfaces contoured for such. FIGS. 6-9 illustrate example contours which may be used for the rear boat extensions considered herein and are described in more detail below, but variations thereof as well as other configurations may be employed. An example of one of the other configurations is for a rear boat extension to have a bottom surface with substantially the same contours as those on an adjacent section of a hull, including but not limited to tunnels, strakes and convex and/or concave surfaces. For example, in reference to FIG. 1, rear boat extension 46 may, in some cases, include a bottom surface contour which is substantially similar to the bottom surface contour of hull 42 at transom 44. Such a configuration may be particularly applicable when the bottom surface of rear boat extension 46 is flush with hull 42 at transom 44, but may be suitable when the bottom surface of rear boat extension 46 is at a level above or below the bottom surface of hull 42 at transom 44. An example of a hull configuration which may be particularly applicable for a rear boat extension in such embodiments is described in U.S. Pat. No. 6,874,441, which is incorporated by reference as if set forth fully herein. In other cases, the rear boat extensions considered herein may include a bottom surface with one or more variations to the contours of those on an adjacent section of a hull or may include entirely different contours than those on an adjacent section of a hull.

Figure 6:
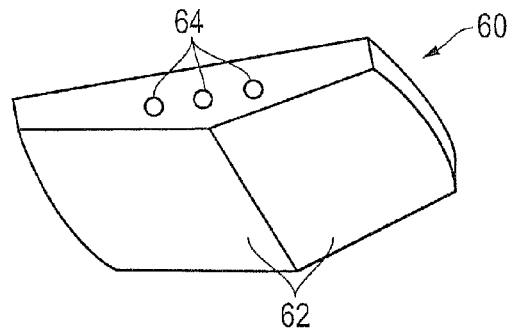
FIGS. 6-8 are perspective bottom views of example rear boat extensions.

As noted above, FIGS. 6-9 illustrate example contours which may be used for the rear boat extensions considered herein. FIG. 6 illustrates rear boat extension 60 having a v-bottom shape which may have convex, concave or substantially planar surfaces 62. Although rear boat extension 60 is shown with convex sidewalls, it is noted that the sidewalls may alternatively be concave or planar. In other cases, rear boat extension 60 may be void of peripheral sidewalls extending up from its bottom. FIG. 6 further illustrates rear boat extension 60 having holes 64 at the back end plate of the rear boat extension. The number, size and placement of the holes may vary from those depicted in FIG. 6. In some cases, holes 64 may be used to aid in the manipulation of water at the stern of the boat to achieve one or more of the objective noted above, including manipulating the size and/or shapes of wakes and/or waves, generating a cleaner wake and/or wave, minimizing prop wash, and controlling exhaust. In some cases, rear boat extension 60 may be void of holes 64 and, in some embodiments, rear boat extension 60 may be void of a back end plate. An example of a rear boat extension without a back end plate is described in more detail below in reference to FIG. 9.

Figure 7:
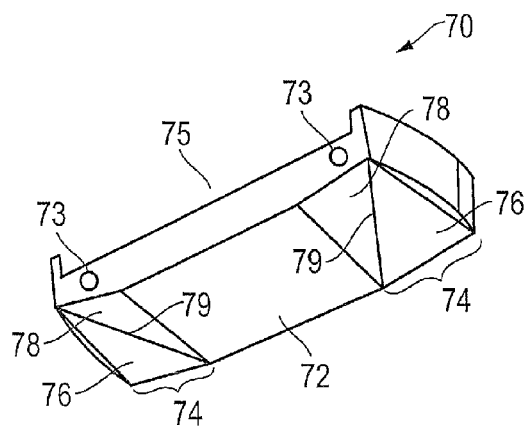

FIG. 7 illustrates rear boat extension 70 having a bottom surface with substantially planar central panel 72 disposed between inward indentations 74. Each of inward indentations 74 include a surface 76 extending from the front end of rear boat extension 70 and from a sidewall surface of rear boat extension 70 at a slope or curve (i.e., convex or concave) to crease 79. In addition, each of inward indentations 74 include a surface 78 extending from the back end of rear boat extension 70 and from central panel 72 at a slope or curve to crease 79. During the development of the rear boat extensions described herein, rear boat extension 70 showed to be beneficial to produce relatively long and large wakes and waves for wakeboarding and wakesurfing. It is contemplated that the inward indentations 74 serve to push water toward respective sides of a boat, producing relatively longer and larger wakes and waves as opposed to the configuration of FIG. 6, for example.

In addition to inward indentations 74 along the bottom side of rear boat extension 70, FIG. 7 illustrates rear boat extension 70 with indentation 75 along its top side. As shown, indentation 75 provides a gap between the peripheral sidewalls at the back end of rear boat extension 70. In some embodiments, indentation 75 may be used to accommodate a swim platform above rear boat extension 70. In other cases, however, indentation 75 may provide a route for water to be removed from an interior of rear boat extension particularly when a boat is near planing. In some cases, rear boat extension 70 may be void of indentation 75. In any case, indentation 75 is not specific to the bottom surface configuration of rear boat extension 70. In particular, any of the rear boat extensions considered herein may include an upper indentation at its back end similar to indentation 75 to accommodate a swim platform above rear boat extension 70 and/or provide a route for water to be removed from an interior of rear boat extension 70. Similar to rear boat extension 60 shown in FIG. 6, although rear boat extension 70 is shown with convex sidewalls, the sidewalls may alternatively be concave or planar. In other cases, rear boat extension 70 may be void of peripheral sidewalls extending up from its bottom. FIG. 7 further illustrates rear boat extension 70 having holes 73 at the back end plate of the rear boat extension. The number, size and placement of the holes may vary from those depicted in FIG. 7. In some cases, rear boat extension 70 may be void of holes 73 and, in some embodiments, rear boat extension 70 may be void of a back end plate.

Figure 25:
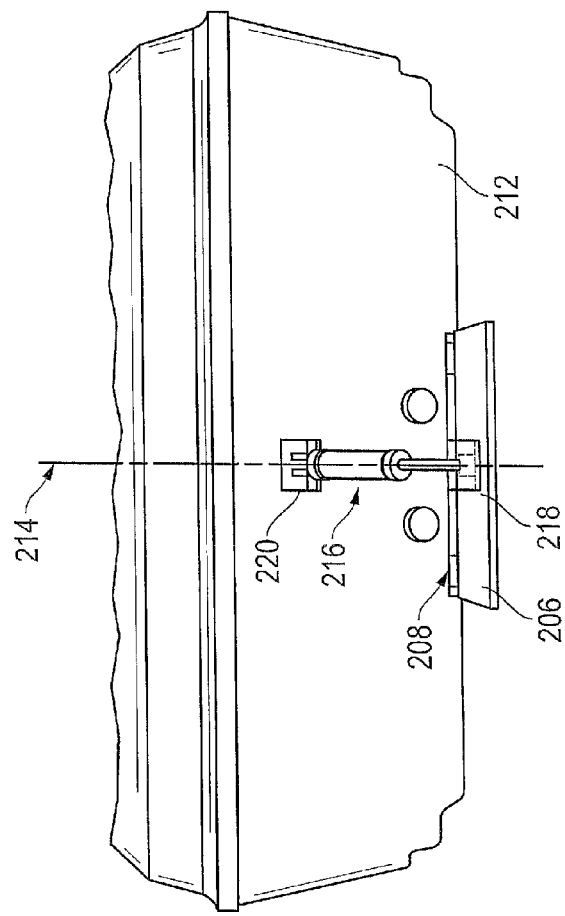
FIG. 25 is a trailing view of a boat with a plate pivotally mounted to the transom of the boat.
Figure 26:
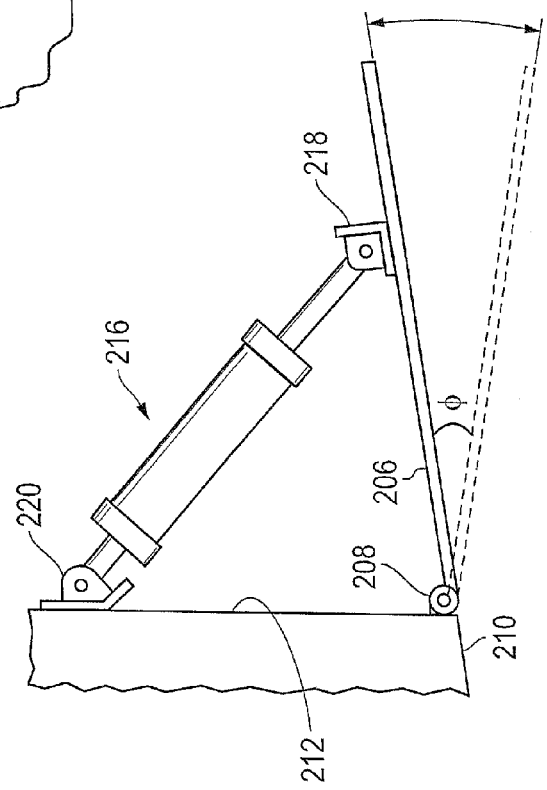
FIG. 26 is an enlarged sectional view taken along the lines 4-4 of FIG. 25.

In some embodiments, the boats considered herein may include a plate 206 pivotally mounted, via a hinge 208, to a bottom edge 210 of a transom 212 of the boat, as shown in FIGS. 25 and 26. Although illustrated separately herein, the plate 206 may be mounted between parts of the rear boat extension affixed to the transom. As shown in FIG. 25, the plate 206 is positioned along the hull's longitudinal centerline which passes through the boat's vertical mid-plane 214. As shown in FIGS. 25-26, the plate 206 extends rearwardly from the transom 212 and has a width less than a width of the transom. The maximum width of the plate 206 is substantially less than the maximum width of the hull at transom 212, and in the example shown, the maximum width of the plate is less than one-third of the maximum width of the hull.

The plate 206 may be used in conjunction with the rear boat extension to manipulate the size and/or shape of wakes and/or waves, particularly by altering its position relative to the transom 212. For instance, the plate 206 may be pivotally mounted, via the hinge 208, to the transom 212 for movement between the two positions represented by the solid and phantom lines shown in FIG. 26. In the position shown by the phantom line, the plate 206 extends downwardly away from the transom 212, so that as the boat passes through the water, upward reaction forces of the water on the plate raise the trailing end, or stern, of the boat upwardly. This position causes the hull to ride substantially flat across the water and produces relatively small wakes in the water, which is conducive to various types of water skiing.

If it is desired to produce relatively large wakes, such as the type desirable for wakeboarding, and the like, the plate 206 may be pivoted, via the hinge 208, so as to extend upwardly toward the transom 212 in the position shown by the solid line shown in FIG. 26. In this position, thrust forces caused by the propeller in the water raise the leading end, or bow, of the boat out of the water so that the hull is at a relatively high angle of attack. Thus, the trailing end, or stern, of the boat sits down into the water so that it effectively digs a trench along the path that it makes through the water, which, in turn, produces relatively large wakes.

Control means are provided for pivoting plate 206 about the axis of the hinge 208 between a raised position, shown in solid line in FIG. 26, and a lowered position shown in broken lines. The control means includes an actuator 216 comprising a hydraulic cylinder. The rod end of the actuator is mounted by a pivot pin to a bracket 218 secured on the top of the plate, and the head end of the cylinder is mounted by a pivot pin to a bracket 220 secured to the stern transom 212. The actuator is extended and contracted by a control circuit for moving the plate 206 through the angle φ which defines the vertical stroke. It has been found that a vertical stroke in the range of only 1½" to 2" is sufficient to vary the wake from a small size to a relatively large size. It is understood that the operator of the boat can utilize the control means to cause pivotal movement of the plate 206 to one or more intermediate positions between the two positions shown in FIG. 26 in the even different positions of the boat in the water are desired.

Figure 8:
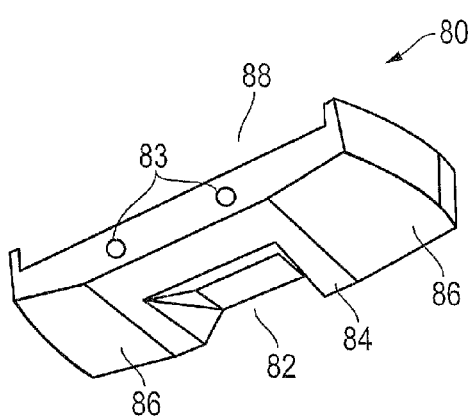
Figure 9:
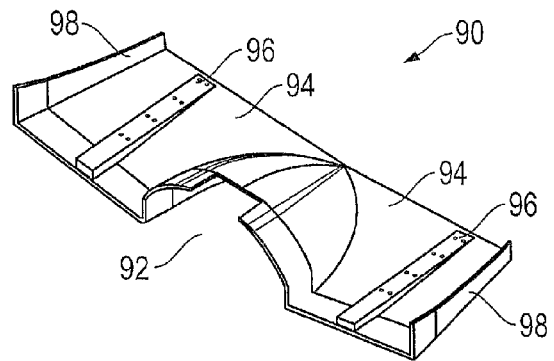
FIG. 9 is a perspective top view of another example rear boat extension.

In view of this pivotal movement of the plate 206 relative to the transom 212, the rear boat extensions considered herein may include a recess to accommodate pivoting of such a plate. FIGS. 8 and 9 illustrate examples of rear boat extensions having recesses which accommodate pivoting of a plate attached to a transom. The configuration of the referenced plate and method of operation may be similar to that disclosed for the plates described in U.S. Pat. No. 5,549,071 and U.S. Pat. No. 6,874,441, both of which are incorporated by reference as if set forth fully herein.

FIG. 8 depicts an example configuration of a rear boat extension including a recess. In particular, FIG. 8 illustrates rear boat extension 80 including recess 82 disposed at its front end. The placement of recess 82 at its front end may be specific for accommodating movement of a plate pivotally mounted on to a boat as described above. As shown in FIG. 8, recess 82 may include a tapered depth toward the rear end of rear boat extension 80. In some cases, recess 82 may terminate before the rear end of rear boat extension 80 such as depicted in FIG. 8. In particular, recess 82 is shown in FIG. 8 bordered by planar section 84 along its sidewalls and the rear end of rear boat extension 80. In other embodiments, recess 82 may extend to the rear end of rear boat extension 80. In either case, a recess of tapered depth within a rear boat extension may provide a cleaner wake or wave versus a non-tapered recess. The recesses within the rear boat extensions considered herein, however, are not necessarily so limited. As such, recess 82 may, in some embodiments, not have a tapered depth. Various contours may be considered for recess 82 as well as for the bottom surface portions of rear boat extension 80 surrounding recess 82. In particular, planar section 84 may, in some cases, extend to the sidewalls of rear boat extension 80. In other embodiments, rear boat extension 80 may include sloped or curved sections 86 disposed between planar section 84 and the sidewalls of the rear boat extension as shown in FIG. 8. In yet other embodiments, sloped or curved sections 86 may abut recess 82. Several other surfaces of differing size, shape and contour may be considered.

Similar to rear boat extension 70 shown in FIG. 7, rear boat extension 80 may include indentation 88 along its top side to accommodate a swim platform above rear boat extension 80 and/or provide a route for water to be removed from an interior of rear boat extension. In other cases, rear boat extension 80 may be void of indentation 88. Similar to rear boat extension 60 shown in FIG. 6, although rear boat extension 80 is shown with convex sidewalls, the sidewalls may alternatively be concave or planar. In other cases, rear boat extension 80 may be void of peripheral sidewalls extending up from its bottom. FIG. 8 further illustrates rear boat extension 80 having holes 83 at the back end plate of the rear boat extension. The number, size and placement of the holes may vary from those depicted in FIG. 8. In some cases, rear boat extension 80 may be void of holes 83 and, in some embodiments, rear boat extension 80 may be void of a back end plate.

Another configuration of a rear boat extension is shown in FIG. 9. FIG. 9 illustrates a top perspective view of rear boat extension 90 with its front end in the foreground in contrast to the bottom perspective views of rear boat extensions 60, 70 and 80 depicted in FIGS. 6-8 with their back ends in the foreground. The top perspective view of rear boat extension 90 is used to illustrate that, in some embodiments, the rear boat extensions considered herein may be void of a top plate. The exclusion of a top plate is not specific to the configuration of rear boat extension 90 and may be applied to any configuration of rear boat extension considered herein. In other embodiments, any of the rear boat extensions considered herein including rear boat extension 90 may include a top plate. Examples of top plates are shown and described in more detail below in reference to FIGS. 22-24. It is noted that the absence or inclusion of a top plate in the rear boat extensions described herein does not preclude the arrangement of a swim platform above the rear boat extensions, nor does the absence of a framework to receive a swim platform within a rear boat extension. In particular, the boats considered herein may include a swim platform arranged above a rear boat extension regardless of the configuration of the rear boat extension, including swim platforms spaced above or in contact with an upper surface of a rear boat extension. The inclusion of a swim platform, however, is not necessary. In some cases, a top plate of a rear boat extension may serve as a swim platform, but it is not necessarily so limited.

Turning back to the configuration depicted in FIG. 9, rear boat extension 90 is shown having recess 92. As illustrated, recess 92 may, in some embodiments, be tapered toward its rear end in both depth and width and include a substantially concave shape. Such a configuration may serve to coil water passing therethrough and effectively produce a cleaner wave for wakesurfing and/or minimize prop wash. The combination of being tapered in depth and width and having a substantially concave shape are not necessarily exclusive and, thus, the rear boat extension recesses considered herein may include one of more of such configurations. Alternative configurations for recesses may be considered as well for recess 92. In any case, recess 92 may extend to the rear end of rear boat extension 90 as shown in FIG. 9. In other embodiments, recess 92 may terminate before the rear end of rear boat extension 90, such as recess 82 of rear boat extension 80 does in FIG. 8. In yet other embodiments, rear boat extension 90 may be void of a recess. In any case, rear boat extension 90 may include planar or curved sections 94 extending to peripheral sidewalls 98. Slats 96 are disposed within the interior of rear boat extension 90 to provide structural support to sections 94. Other structural supports may be considered as needed and structural supports, in general, may be included in any of the rear boat extension configurations considered herein according to design specifications for a rear boat extension.

As shown in FIG. 9, rear boat extension 90 may be void of a back end plate. The absence of a back end plate provides a gap between the sidewalls at the back end of rear boat extension 90 and may be advantageous for providing a route for water to be removed from an interior of the rear boat extension. Other types of gap configurations which may be used to facilitate water removal from the interior of rear boat extensions are shown and described in more detail below in reference to FIGS. 20 and 21 and may alternatively be used for rear boat extension 90 (as well as the other rear boat extensions described herein). In yet other embodiments, rear boat extension 90 (as well as the other rear boat extensions described herein) may not include a gap between the peripheral sidewalls at its back end. In particular, any of the rear boat extensions described herein may include a solid plate extending between their peripheral sidewalls at is back end and comprising the depth of such peripheral sidewalls. In other cases, rear boat extension 90 may be void of peripheral sidewalls extending up from its bottom.

Figure 14:
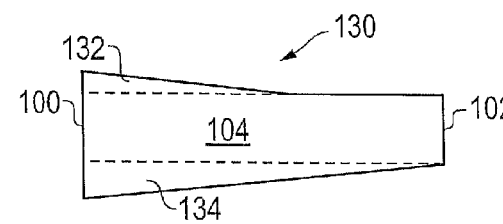
Figure 15:
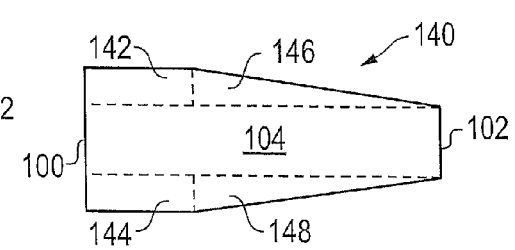
Figure 16:
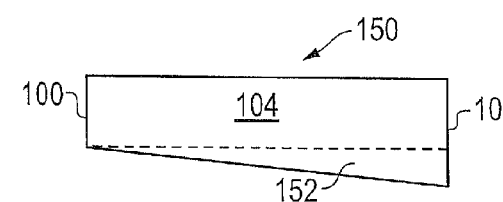
Figure 17:
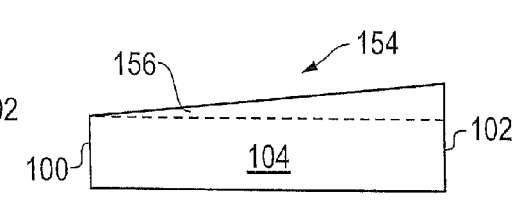

As further shown in FIG. 9, rear boat extension 90 may include one or more tapered peripheral sidewalls extending up from its bottom. In general, the rear boat extensions described herein may include a variety of tapered peripheral sidewall configurations extending up from its bottom, a sampling of which is described in detail in reference to FIGS. 10-19. In particular, FIGS. 10-19 illustrate various configurations of peripheral sidewalls of rear boat extensions having forward and rearward ends respectively disposed in relation to the front ends and rear ends of the rear boat extensions. The forward and rearward ends of the peripheral sidewalls are commonly referenced as forward end 100 and rearward end 102 among FIGS. 10-19 to simplify the description of the various configurations. As shown in FIGS. 10-15, in some cases, a peripheral sidewall of a rear boat extension may be tapered toward its rearward end 102 and, conversely, in some embodiments as shown in FIGS. 16 and 17, a peripheral sidewall of a rear boat extension may be tapered toward its forward end 100. To describe the various tapered configurations for peripheral sidewalls of rear boat extensions, each of the embodiments depicted in FIGS. 10-17 are described as having a portion 104 of constant depth extending from the forward end to the rearward end of the peripheral sidewall and having one or more tapered depths above and/or below portion 104. In general, portion 104 may be of any depth depending on the objective for the rear boat extension as well as the design of a boat to which the rear boat extension is attached.

Figure 10:
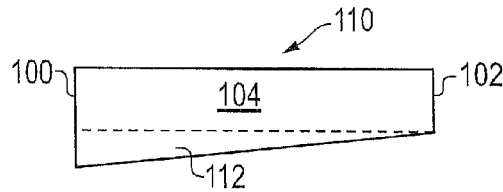
FIGS. 10-17 are side views of peripheral sidewalls of example rear boat extensions.
Figure 11:
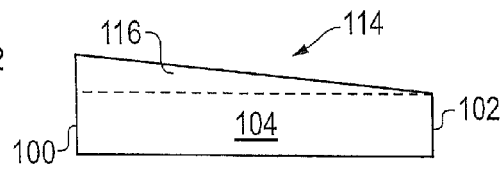
Figure 12:
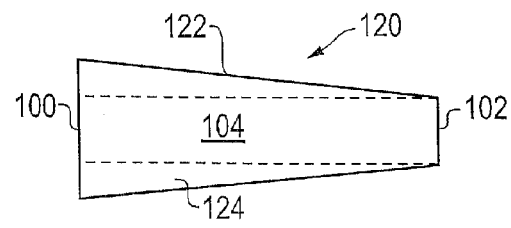
Figure 13:
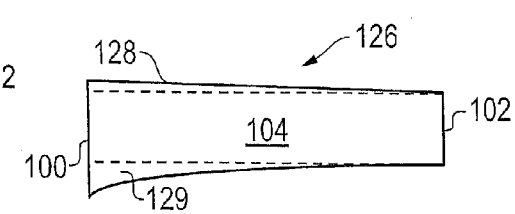

Turning to FIG. 10, peripheral sidewall 110 is shown having tapered portion 112 below constant depth portion 104 and comprising a lowermost part of the sidewall. In a converse configuration depicted in FIG. 11, peripheral sidewall 114 is shown having tapered portion 116 above constant depth portion 104 and comprising an uppermost part of the sidewall. Example configurations of peripheral sidewalls having tapered portions above and below constant depth portion 104 are illustrated in FIGS. 12-15. In particular, FIG. 12 illustrates peripheral sidewall 120 having tapered portions 122 and 124 of substantially equal dimensions respectively above and below constant depth portion 104, making up the uppermost and lowermost parts of peripheral sidewall 120, respectively. FIG. 13 illustrates peripheral sidewall 126 having tapered portions 128 and 129 of different depths and surface curvature respectively above and below constant depth portion 104, making up the uppermost and lowermost parts of peripheral sidewall 126, respectively. FIG. 14 illustrates peripheral sidewall 130 having tapered portions 132 and 134 of different lengths respectively above and below constant depth portion 104, making up the uppermost and lowermost parts of peripheral sidewall 130, respectively. FIG. 15 illustrates peripheral sidewall 140 having constant depth portions 142 and 144 and tapered portions 146 and 148 respectively disposed above and below constant depth portion 104, making up the uppermost and lowermost parts of peripheral sidewall 130, respectively.

It is noted that other configurations of peripheral sidewalls having a tapered configuration towards their rearward ends may be considered for the rear boat extensions described herein and, thus, the rear boat extensions described herein are not limited to the peripheral sidewall configurations depicted in FIGS. 10-15. In particular, any the configurations denoted in FIGS. 10-15 may be combined, substituted or varied or new configurations may be employed which result in a tapered rearward end. For example, the lengths of constant portions 142 and/or 144 may be varied from that which are depicted in FIG. 15, making tapered portions 146 and/or 148 shorter or longer. In addition or alternatively, the length of tapered portions 112 and 116 in FIGS. 10 and 11 may be shortened and/or their surface curvature may be altered.

As noted above, FIGS. 16 and 17 show example configurations of peripheral sidewalls that are tapered toward their forward end. In particular, FIG. 16 illustrates peripheral sidewall 150 having tapered portion 152 below constant depth portion 104 and comprising a lowermost part of the sidewall. In a converse configuration depicted in FIG. 17, peripheral sidewall 154 is shown having tapered portion 156 above constant depth portion 104 and comprising an uppermost part of the sidewall. Other configurations of peripheral sidewalls that are tapered toward their forward end may be considered. For example, any of the configurations depicted in FIGS. 12-15 may be mirrored to be tapered toward a front end of a peripheral sidewall.

Figure 18:
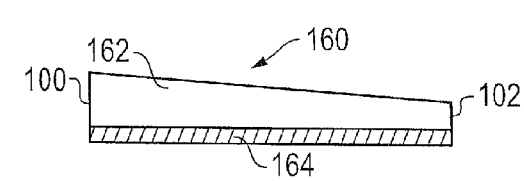
FIGS. 18-19 are side views of example rear boat extensions denoting possible placement of peripheral sidewalls relative to bottoms of the rear boat extensions.
Figure 19:
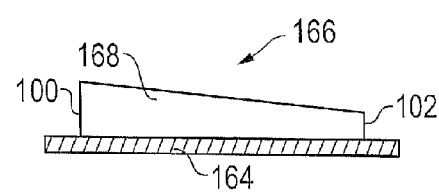

In any case, a peripheral sidewall may, in some embodiments, extend the length of a rear boat extension. In other words, the forward and rearward ends of a peripheral sidewall may be at the front and rear ends of the rear boat extension. FIG. 18 illustrates such an embodiment with cross-section 160 having peripheral sidewall 162 disposed upon bottom rear boat extension surface 164. In some embodiments, however, a peripheral sidewall need not extend the length of a rear boat extension (i.e., the forward and/or rearward ends of a peripheral sidewall may be in alignment with the front and/or rear ends of the rear boat extension). An example of an embodiment is depict in FIG. 19 in which cross-section 166 is shown with peripheral sidewall 168 disposed upon bottom rear boat extension surface 164. Having a forward and/or reward corner of a hull absent a peripheral sidewall may advantageously provide a route for water to be removed from an interior of a rear boat extension, particularly when a boat is near planning.

It is further noted that although the rear boat extensions considered herein may include two peripheral sidewalls extending up from their bottom (i.e., a peripheral sidewall on each the port and sideboard side of a rear boat extension), the rear boat extensions considered herein are not necessarily so limited. In particular, a rear boat extension may include a single peripheral sidewall extending up from its bottom. Such a configuration may be conducive for wakesurfing in which a boat is listed to one side. In particular, since the boat will be listed to one side, the presence of a peripheral sidewall on the opposing side will not be germane to creating a desirable wave. In some cases, a rear boat extension may include a peripheral sidewall having a configuration suitable for placement on either side of the rear boat extension (i.e., the port or sideboard side of the rear boat extension). In such cases, the rear boat extension and the peripheral sidewall may be configured for detachment from each other and a user could choose which side the peripheral sidewall is attached or forego attachment depending on a desired objective. In yet other embodiments, the rear boat extensions considered herein may be void of peripheral sidewalls extending up from their bottom.

Figure 20:
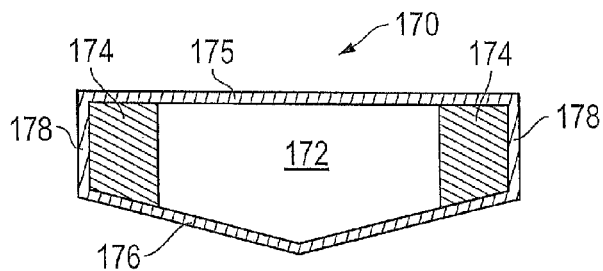
FIGS. 20-21 are back views of example rear boat extensions.
Figure 21:
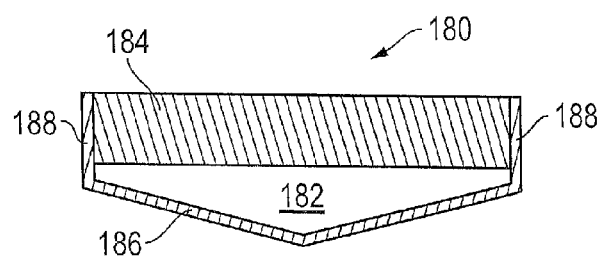

As noted above, the rear boat extensions considered herein may, in some embodiments, include a gap between their peripheral sidewalls at their back end. As further set forth above, particularly with respect to FIGS. 6-8, a gap may be a hole within a back plate of the rear boat extension. In yet other embodiments, such as described in reference to FIG. 9, a rear boat extension may be void of a backside plate, the absence of which forms a gap between its peripheral sidewalls. Other configurations of gaps at the backend of rear boat extensions are shown in FIGS. 20 and 21. In particular, FIG. 20 illustrates a back end of rear boat extension 170 with gap 172 disposed between plates 174, both of which are bounded by top side 175, bottom side 176 and peripheral sidewalls 178 of rear boat extension 170. As shown in FIG. 20, gap 172 extends from top side 175 to bottom side 176 without intervening material and, thus, gap 172 is referenced as extending the depth of the back end portion of rear boat extension 170. As noted above, the rear boat extensions considered herein may, in some embodiments, be void of a top side plate and, thus, top side 175 may be omitted from rear boat extension 170. In such cases, gap 172 may still be reference as extending the depth of the back end portion of rear boat extension 170.

FIG. 21 shows an alternative configuration of a gap at a back end of a rear boat extension. In particular, FIG. 21 illustrates rear boat extension 180 with gap 182 disposed between plate 184 and bottom side 186 of rear boat extension 180. As shown in FIG. 21, gap 182 extends between peripheral sidewalls 188 without intervening material and, thus, gap 182 is referenced as extending the width of the back end portion of rear boat extension 180. Rear boat extension 180 further illustrates an embodiment void of a top side plate, but it may be modified to have one. In any case, other configurations of back end gaps may be considered for the rear boat extensions described herein. For example, gaps may be arranged at the corners of the back end of a rear boat extension. Alternatively, a rear boat extension may have an upper back end plate and a lower back end plate extending the width of the back end of the rear boat extension with a gap therebetween. Several other configurations may be considered as well.

As set forth above, the rear boat extensions considered herein may or may not include a top side plate. In embodiments in which a top side plate is used, the top side plate may be of several different configurations. For example, in some cases, a top plate may be employed which extends between forward and rearward ends of a rear boat extension and between the rear boat extension's peripheral sidewalls. In such a case, the interior of the rear boat extension is not exposed at its upper surface. Other configurations which do expose the interior of a rear boat extension may be considered as well, a few of which are shown and described in reference to FIGS. 22-24.

Figure 22:
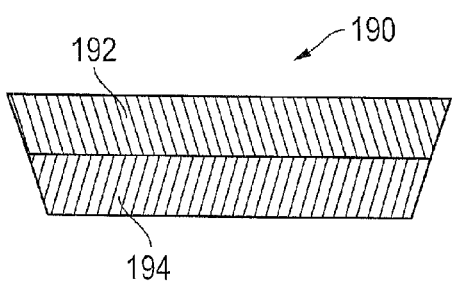
FIGS. 22-24 are top views of example rear boat extensions.
Figure 23:
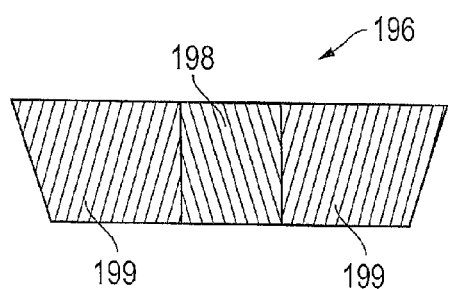
Figure 24:
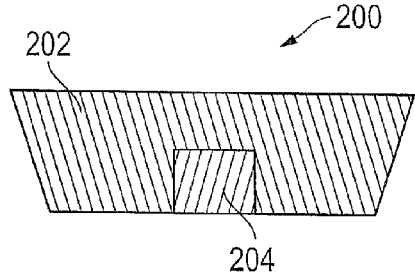

In particular, FIG. 22 illustrates an example top side of a rear boat extension with length less than a length of the rear boat extension. As shown in FIG. 22, top plate 192 extends from a front end of rear boat extension 190 to a mid region of rear boat extension 190, exposing inner portion 194 of the rear boat extension. In general, the size, shape, and position of top plate 192 may be varied depending on the design desired and/or the objective of the rear boat extension. FIG. 23 illustrates an example of a top side of a rear boat extension having a width less than a width of the rear boat extension. As shown in FIG. 23, top plate 198 extends between front and rear ends of rear boat extension 196, exposing inner portions 199 of the rear boat extension. In general, the size, shape, and position of top plate 198 may be varied depending on the design desired and/or the objective of the rear boat extension. Another example configuration of a top plate is shown in FIG. 24. In particular, FIG. 24 illustrates rear boat extension 200 having top plate 202 having a hole to expose interior portion 204 of rear boat extension 200. The hole of top plate 202 is shown at the middle rear end of the rear boat extension, but may generally be placed anywhere along top plate 202. In addition, the size and shape of the hole may be varied depending on the design desired and/or the objective of the rear boat extension.

It will be appreciated to those skilled in the art having the benefit of this disclosure that this invention is believed to provide rear boat extensions for boats. Further modifications and alternative embodiments of various aspects of the invention will be apparent to those skilled in the art in view of this description. For example, although the description of methods, devices and systems provided herein are specific to configurations for manipulating and enhancing wakes and waves for water sports, the rear boat extensions provided herein are not necessarily so limited. In particular, the rear boat extensions considered herein may be designed for manipulating water flow for any desired objective at a stern of a boat. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A boat, comprising:
   a transom;
   a plate pivotally mounted via a hinge near a bottom edge of the transom, wherein the plate is pivotable about an axis of the hinge upwardly toward the transom and downwardly away from the transom; and
   a rear boat extension attached to the transom, wherein the rear boat extension comprises:
      a bottom portion comprising a recess configured to accommodate pivoting of the plate beneath the bottom portion, wherein the recess is disposed at a front end of the rear boat extension, and wherein a depth of the recess tapers toward a rear end of the rear boat extension; and
      a peripheral sidewall extending from the bottom portion and having forward and rearward ends respectively closer and farther from the transom, wherein the forward end comprises an upper surface at a level below an upper edge of the transom, and wherein the peripheral sidewall comprises:
         a first portion of a constant depth extending from the forward end to the rearward end; and
         a second portion above the first portion, wherein the second portion comprises an uppermost part of the peripheral sidewall, and wherein a depth of the second portion is tapered from substantially the forward end to the rearward end of the peripheral sidewall.

2. The boat of claim 1, wherein the peripheral sidewall further comprises a third portion below the first portion, wherein the third portion comprises a lowermost part of the peripheral sidewall, and wherein a depth of the third portion is tapered from substantially the forward end to the rearward end of the rear boat extension.

3. The boat of claim 2, wherein the third portion and the second portion have different lengths, depths or surface curvatures.

4. The boat of claim 1, wherein the first portion comprises a lowermost part of the peripheral sidewall.

5. The boat of claim 1, wherein the peripheral sidewall extends the length of the rear boat extension.

6. The boat of claim 1, wherein the peripheral sidewall has a length less than a length of the rear boat extension.

7. The boat of claim 1, wherein the peripheral sidewall is one of two peripheral sidewalls making up opposing sides of the rear boat extension.

8. The boat of claim 1, wherein the plate is pivotally mounted to the transom between parts of the rear boat extension affixed to the transom, and wherein the plate extends rearwardly from the transom with its width less than a width of the transom.

9. The boat of claim 1, wherein the rear boat extension is one of two rear boat extensions attached to the transom and arranged on opposing port and starboard sides of the boat.

10. The boat of claim 9, further comprising actuators for independently moving the two rear boat extensions.

11. The boat of claim 7, wherein the bottom portion extends between the two peripheral sidewalls and comprises sloped or curved sections.

12. The boat of claim 11, wherein a bottom surface of the bottom portion of the rear boat extension comprises a contour substantially similar to a bottom surface contour of a hull of the boat at the transom.

13. The boat of claim 1, wherein a width of the rear boat extension is substantially the same as a width of the transom.

14. The boat of claim 1, wherein a length of the rear boat extension ranges between about 1 foot and about 5 feet.

15. The boat of claim 1, further comprising one or more actuators coupled between the transom and the rear boat extension, wherein the one or more actuators are configured for moving the rear boat extension up toward the transom and down away from the transom to thereby move the rear boat extension in and out of the water in which the boat resides.

16. The boat of claim 12, wherein the bottom surface of the bottom portion of the rear boat extension is substantially flush with the bottom surface contour of the hull at the transom, so that the rear boat extension serves to extend a running surface of the hull.

17. The boat of claim 1, wherein the recess terminates before the rear end of the rear boat extension.

18. The boat of claim 17, wherein the recess extends to the rear end of the rear boat extension.

19. The boat of claim 17, wherein the recess tapers toward the rear end of the rear boat extension in both depth and width and includes a substantially concave shape.

20. The boat of claim 1, wherein the plate is positioned along a longitudinal centerline of a hull of the boat, and wherein a maximum width of the plate is less than one-third of a maximum width of the hull.

21. The boat of claim 1, further comprising an actuator mounted between the transom and a top of the plate for pivoting the plate about the axis of the hinge.

22. A rear boat extension for a boat, the boat comprising a transom and a plate pivotally mounted via a hinge near a bottom edge of the transom, wherein the plate is pivotable about an axis of the hinge upwardly toward the transom and downwardly away from the transom, wherein the rear boat extension is attached to the transom, and wherein the rear boat extension comprises:

a bottom portion comprising a recess configured to accommodate pivoting of the plate beneath the bottom portion, wherein the recess is disposed at a front end of the rear boat extension, and wherein a depth of the recess tapers toward a rear end of the rear boat extension; and a peripheral sidewall extending from the bottom portion and having forward and rearward ends respectively closer and farther from the transom, wherein the forward end comprises an upper surface at a level below an upper edge of the transom, and wherein the peripheral sidewall comprises:

a first portion of a constant depth extending from the forward end to the rearward end; and a second portion above the first portion, wherein the second portion comprises an uppermost part of the peripheral sidewall, and wherein a depth of the second portion is tapered from substantially the forward end to the rearward end of the peripheral sidewall.

\* \* \* \* \*